United States Patent [19]

Burroughs et al.

[11] 3,760,097

[45] Sept. 18, 1973

[54] ADJACENT CATV CHANNEL JAMMING

[75] Inventors: Robert S. Burroughs, Redondo Beach; F. Douglas Forbes, Palos Verdes, both of Calif.

[73] Assignee: Hughes Aircraft Company, Culver City, Calif.

[22] Filed: June 26, 1972

[21] Appl. No.: 266,033

[52] U.S. Cl. .................... 178/5.1, 325/132, 325/308
[51] Int. Cl. .................... H04n 1/44
[58] Field of Search .................... 178/5.1, DIG. 13; 325/308, 51, 132, 32

[56] References Cited

UNITED STATES PATENTS

| | | | |
|---|---|---|---|
| 3,333,198 | 7/1967 | Mandell et al. | 325/308 |
| 2,478,311 | 8/1949 | Pease | 325/132 |
| 2,658,992 | 11/1953 | Byrne | 325/132 |

*Primary Examiner*—Benjamin A. Borchelt
*Assistant Examiner*—S. C. Buczinski
*Attorney*—W. H. MacAllister, Jr. et al.

[57] ABSTRACT

A system for allowing the intelligible reception of a selected CATV channel at the subscriber's TV set and for jamming the CATV channels adjacent to the selected channel so that the subscriber cannot intelligibly receive the adjacent channels by adjusting the fine tuning control on his TV set. In one embodiment, the output signal of a first oscillator which sweeps from 3 to 9 megahertz is heterodyned in a double balanced mixer with the output signal of a second oscillator which is tuned to the center frequency of the selected channel spectrum appearing at the output of a CATV converter. The suppressed carrier, modulated sidebands from the mixer are then added to the selected channel spectrum in order to jam the channels adjacent to that selected channel.

6 Claims, 4 Drawing Figures

ADJACENT CATV CHANNEL JAMMING

BACKGROUND OF THE INVENTION

1. Field of the Invention

This invention relates to a cable television system and particularly to a system for jamming the two cable television channels adjacent to a channel selected by a subscriber.

2. Description of the Prior Art

The term "CATV," Community Antenna Television, today represents a broad field of television programming and communications which includes both one-way and two-way communications between a central transmitter and CATV subscribers.

Many systems have been proposed fo selectively transmitting various television programs to subscribers. In some of these systems various scrambling techniques have been disclosed in which the video and sound are scrambled by a coder unit in each of the channels being transmitted. This ensures that a conventional television receiver will receive an unintelligible signal that cannot be viewed normally. However, when the television receiver is equipped with a decoder to unscramble the coded signal, normal video and sound can be received for the selected channel. The use of the decoder to unscramble the coded signal is generally recorded for billing the subscriber at some later time. The use of coder and decoder units for the various television channels involves complex and expensive equipment at the transmitter and CATV subscriber locations.

In other systems, a plurality of unscrambled subscription television programs are transmitted to each of a plurality of subscribers. A subscriber selects a television channel to be received at his TV set by positioning a converter switch to the desired channel. In some positions of the converter switch free television channels may be received. In other positions of the switch pay television channels may be received with the subscriber being billed accordingly. In these systems it is possible for the subscriber to position the converter switch to a free channel and adjust the fine tuning control on his TV set to receive an adjacent pay or restricted TV channel. The subscriber could also select a less expensive pay TV channel and fine tune his TV set to receive a more expensive adjacent pay TV channel. In either of the above ways, the subscriber could therefore "cheat" the CATV operator, thereby reducing the operator's revenue.

Another possible system involves the use of complicated and expensive filters to remove the signals in the channels adjacent to the selected TV channel.

None of the above systems, or any other known CATV system, provides a relatively inexpensive mechanization for preventing a subscriber from fine tuning his TV set to a pay or restricted channel adjacent to the channel selected.

It is therefore an object of this invention to only allow the television channel selected to be viewed by a subscriber.

Another object of this invention is to positively monitor and control the output of a TV converter.

A further object of this invention is to provide a novel, compact and economical system which band limits the output of a frequency converter by jamming the channels adjacent to the television channel selected by a subscriber.

SUMMARY OF THE INVENTION

Briefly, a novel system is provided for only allowing the CATV channel selected to be viewed and for not allowing the television channels adjacent thereto to be viewed by adjusting the fine tuning control on the subscriber's TV set. In one embodiment, the invention heterodynes the sweep frequency output of a first oscillator with the fixed frequency output of a second oscillator in a double balanced mixer. The suppressed carrier, modulated sine wave output from the mixer is then added to the output of a TV converter to interfere with the channels adjacent to the selected channel.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein.

DESCRIPTION OF THE PREFERRED EMBODIMENT

Figures 1, 2, 3, 4:
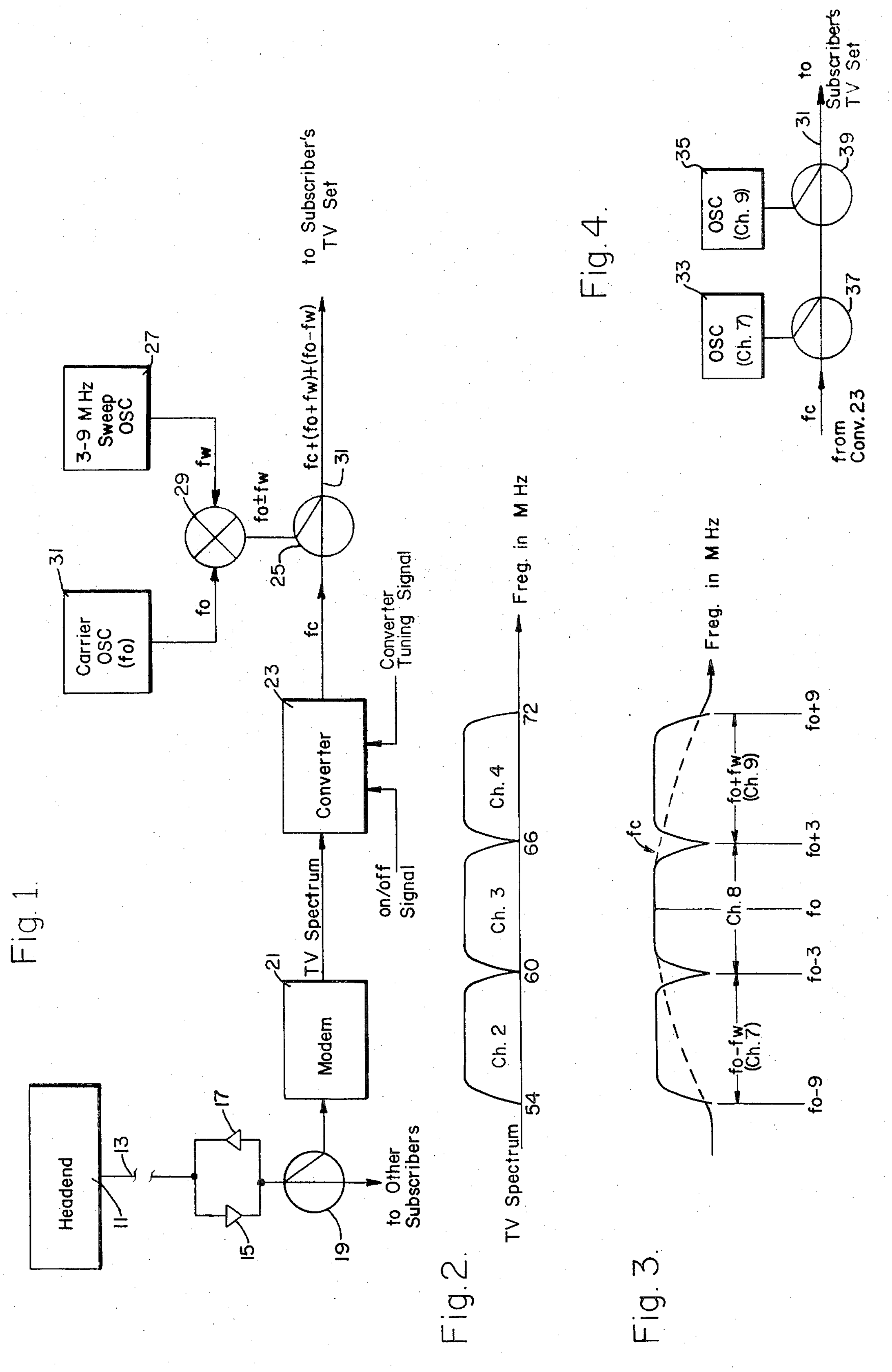
FIG. 1 is a simplified block diagram of a portion of a CATV system which incorporates the invention.
FIGS. 2 and 3 illustrate waveforms useful in explaining the operation of the system of FIG. 1.
FIG. 4 modifies a portion of the system of FIG. 1 to illustrate a second embodiment of the invention.

Referring now to the drawings, FIG. 1 discloses a portion of a CATV network which incorporates the invention. Television signals are transmitted downstream from a headend 11 into a main trunk line 13 for ultimate reception by CATV subscribers. One or more downstream amplifiers, such as the downstream amplifier 15, may be coupled in series with the main trunk line 13 to compensate for cable losses in the system. The downstream amplifier 15 is a broadband amplifier designed to pass the frequencies lying in the downstream transmission band. In a two-way CATV system a broadhand upstream amplifier 17 may be parallel coupled to the downstream amplifier 15 to compensate for cable losses associated with upstream transmissions.

In the operation of the invention, downstream transmissions on the trunk line 13 are applied through a downstream tap 19 to a modem (modulator/demodulator) 21 at a subscriber terminal. The modem 21 separates the television programs in the TV spectrum from the downstream transmissions, which can also include digital data, pilot tones and radio signals. The television programs in the TV spectrum are applied from the modem 21 to a converter 23. The conventional television channels 2, 3 and 4 in the TV spectrum are illustrated in FIG. 2 at their assigned frequencies to aid in the understanding of the operation of the system of FIG. 1.

It should be noted that FIG. 1 specifically illustrates a portion of a two-way CATV system which allows two-way (upstream and downstream) communications between the subscribers and the headend 11. When the invention is used in a one-way system (only downstream transmissions), the modem 21 and all upstream amplifiers, such as the upstream amplifier 17, can be eliminated and the tap 19 coupled directly to the converter 23.

The operation of the converter 23 is controlled by on/off and converter tuning signals from other equipment (not shown) at the subscriber terminal. The converter tuning signal, for example, can be used to vary the capacitance of a varactor diode (not shown), thereby tuning the converter 23 to the TV channel selected by the subscriber. When the subscriber's TV set is turned "off" an "off" signal disables the converter 23, thereby preventing any TV program from being applied to the subscriber's TV set. On the other hand, when the subscriber's TV set is turned "on" an "on" signal enables the converter 23 to pass the selected TV channel through a top 25 to the subscriber's TV set. The converter 23 operates to either upconvert or downconvert the TV channel selected by the subscriber to produce an output spectrum $f_c$ having a center frequency $f_o$ at the center of, for example, channel 8.

Assume that the subscriber has selected channel 3 (60–66 MHz) and that channel 3 is showing a free Tv program while channel 2 (54–60 MHz) is showing a pay Tv program and channel 4 (66–72 MHz) is showing a restricted program which may or may not be a pay TV program as well. A restricted TV program can only be viewed by a subscriber if he is one specifically authorized to receive the requested restricted program. Restricted subscriber groups, for example, may be respectively composed of doctors, lawyers, or other subscribers sharing a common interest. Restricted TV programs therefore might comprise programs of interest to only those selected groups of persons.

Under the above assumed conditions channel 3 is upconverted by the converter to channel 8 (180–186 MHz), while channels 2 and 4 are respectively upconverted to channels 7 (174–180 MHz) and 9 (186–192 MHz). The output frequency spectrum $f_c$ from the converter 23 can therefore include the frequency spectrum between 174 MHz and 192 MHz. Since the center of the output frequency spectrum from the converter 23 is always, for example, 183 MHz ($f_o$), the frequency selector switch on the subscriber's TV set is positioned to receive channel 8. If no adjacent channel jamming signals were used, it is possible that channel 7 and 9 (upconverted channels 2 and 4) could be viewed by adjusting the fine tuning control on the subscriber's Tv set.

To prevent the subscriber from viewing either a pay channel without charge or a restricted channel without authorization that happens to be adjacent to a selected free channel, additional circuits are added. More specifically, an oscillator 27 which sweeps from 3 MHz to 9 MHz is modulated in a double balanced mixer 29 with the output of a carrier oscillator 31 which is oscillating at the center frequency $f_o$ of channel 8. For the sake of simplicity, the sweep frequency output of the oscillator 27 will hereinafter be designated as $f_w$. The mixer 29 suppresses the carrier frequency $f_o$ and adds the sum and difference modulated sideband frequencies $f_o + f_w$ and $f_o - f_w$, via the tap 25, to the output passband $f_c$ from the converter 23. It should be noted that the units 25, 27, 29 and 31 could be physically incorporated into the converter 23, which in turn could even be incorporated into the subscriber's TV set.

The summed bands of frequencies at the output of the tap 25, which are applied to the subscriber's TV set by way of a cable 31, are illustrated in FIG. 3. The portion of the illustrated frequency spectrum encompassed by the dashed lines represents the output passband $f_c$ from the converter 23. Since $f_w$ is a band of frequencies from 3 MHz to 9 MHz, channel 7 is jammed by the modulated lower sideband frequencies $f_o - f_w$ which range from $f_o - 3$ MHz to $f_o - 9$ MHz, while channel 9 is jammed by the modulated upper sideband frequencies $f_o + f_w$ which range from $f_o + 3$ MHz to $f_o + 9$ MHz. Thus, only the desired signal bandwidth of channel 8, as designated by the shaded area between $f_o - 3$ MHz and $f_o + 3$ MHz, contains an unjammed TV program. If the subscriber attempts to adjust the fine tuning control on his TV set to receive either channel 7 or channel 9, he will merely receive unintelligible video and sound on those adjacent channels.

FIG. 4 illustrates another embodiment of the invention which eliminates the requirement for the double balanced mixer 29. The outputs of oscillators 33 and 35 are frequency multiplexed onto the cable 31 with the output $f_c$ from the converter 23 by way of their associated taps 37 and 39. In one type of operation the oscillators 33 and 35 can develop sweep frequency outputs which sweep channels 7 and 9, respectively, to jam or interfere with the video and sound in those channels without interfering with channel 8. In another type of operation the oscillators 33 and 35 can each develop a nonlinear, fixed-frequency output containing spurious harmonic signals. In this case the center frequencies of the outputs of the oscillators 33 and 35 would respectively be at the centers of the adjacent channels 7 and 9 in order to jam the intelligence contained within the bandwidths of those channels without jamming channel 8. In a third type of operation the oscillators 33 and 35 can each develop a single fixed frequency at the center of its associated channel, provided that the output frequency spectrum $f_c$ from the converter 23 is phase locked so its center frequency is always $f_o$. This type of operation would overload the front end of the subscriber's TV set, thereby generating harmonics or harmonic spurs which would jam the video and sound frequencies in each adjacent channel only.

The invention thus provides a system which adds signals to the output of a TV converter to jam the Tv channels adjacent to the channel selected by a CATV subscriber in order to prevent the subscriber from viewing one of the adjacent channels by fine tuning his TV set to one of the adjacent channels.

While the salient features have been illustrated and described, it should be readily apparent to those skilled in the art that other modifications can be made within the spirit and scope of the invention as set forth in the appended claims.

What is claimed is:

1. In a subscription television network for supplying television programs from a central station to a plurality of subscriber stations, each subscriber station including a system comprising:

first means for converting a television channel selected at the subscriber station to a predetermined channel; and second means coupled to said first means for adding signals to the predetermined channel in order to jam only the channels adjacent to the selected television channel.

2. The system of claim 1 wherein said second means includes:

first and second oscillators coupled to said first means for respectively developing signals to jam only the channels adjacent to the selected television channel.

3. The system of claim 2 wherein:

said first and second oscillators are sweep frequency oscillators for respectively sweeping across the bandwidths of the adjacent channels.

4. The system of claim 2 wherein:

said first and second oscillators are fixed frequency oscillators respectively having center frequencies corresponding substantially to the center frequencies of the adjacent channels.

5. The system of claim 1 wherein said second means includes;

a first oscillator for developing a first signal substantially at the center frequency of the predetermined channel;

a second oscillator for developing a sweep frequency output between preselected frequency limits; and third means coupled to said first means and to said first and second oscillators for developing first and second jamming signals to respectively jam the channels adjacent to the selected television channel.

6. In a cable television network having a distribution network for transmitting a plurality of television programs between a central station and a plurality of subscriber stations, an adjacent channel jamming system at each subscriber station, each system comprising:

a converter coupled to the distribution network for converting a television channel selected at the subscriber station to a predetermined television channel;

a first oscillator for generating a first signal at substantially the center frequency of the predetermined television channel;

a second oscillator for generating a second signal which sweeps in frequency between preselected frequency limits;

a mixer, coupled to said first and second oscillators, being responsive to the first and second signals therefrom for developing suppressed carrier, first and second modulated sidebands; and means for combining the first and second modulated sidebands with the predetermined television channel in order to jam television channels adjacent thereto.

* * * * *